May 16, 1944.   R. C. DARNELL   2,349,145
GOVERNOR
Filed Oct. 12, 1942
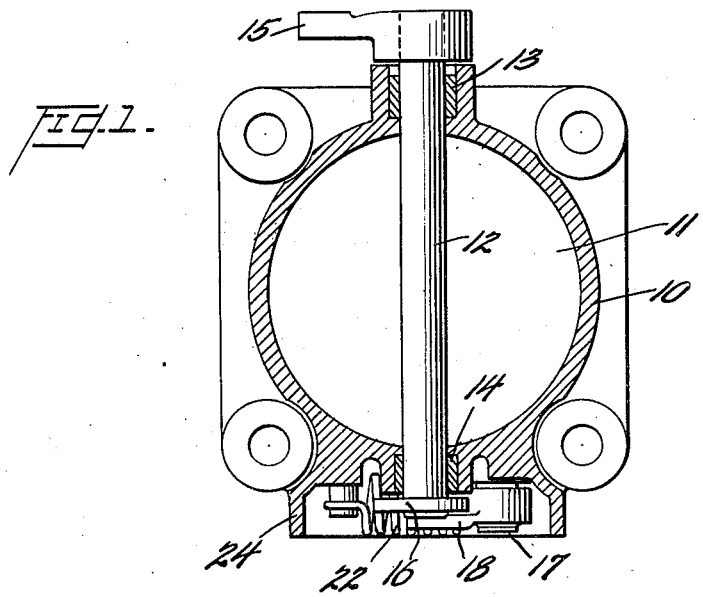
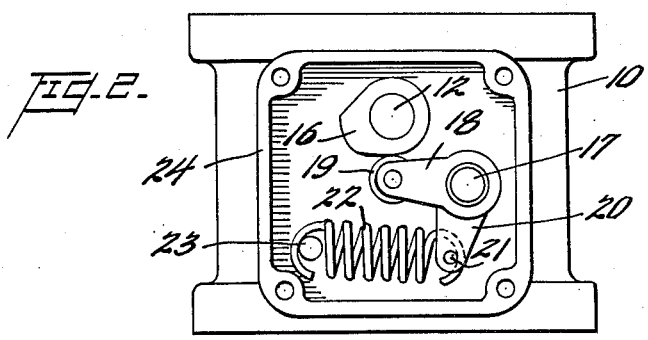
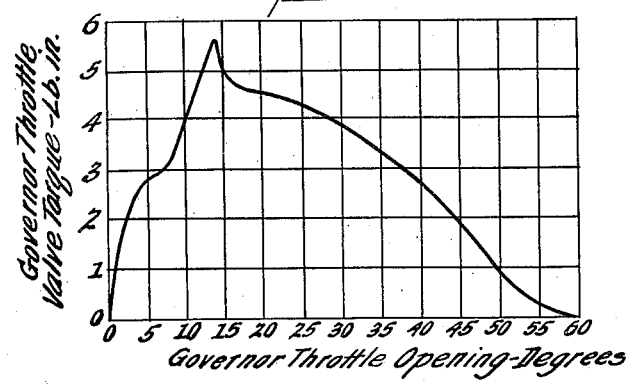
Inventor
Rex C. Darnell
By Watson, Cole, Grindle for Watson
Attorneys Patented May 16, 1944

2,349,145

UNITED STATES PATENT OFFICE 2,349,145

GOVERNOR

Rex C. Darnell, Dexter, Mich., assignor to King-Seeley Corporation, Ann Arbor, Mich., a corporation of Michigan Application October 12, 1942, Serial No. 461,823

4 Claims. (Cl. 137—152)

The present invention relates to speed governing devices for prime movers, and more particularly to such devices in which the flow of fuel mixture or other motive fluid to the prime mover is controlled by a butterfly valve of the so-called balanced type. Typical of such devices is the fly-weight governor, which may be wholly mechanical or, alternatively, may employ hydraulic means alone or in conjunction with mechanical means for resisting the valve-closing movements of the fly-weight.

Such devices ordinarily employ throttle valves of the butterfly type in which the spindle is mounted centrally of the conduit and the plate is mounted symmetrically on the spindle, so as to expose an equal area on either side of the spindle. Such a valve is geometrically "balanced" and is generally referred to, in the governor art, as a balanced valve. Moreover, it has generally been assumed that such valves are dynamically balanced as well, i. e., it has been supposed that, since an equal area is exposed on either side of the spindle, the flow of fuel mixture or motive fluid past the valve does not give rise to any turning moment in the latter. On the other hand, certain investigators have determined that notwithstanding the geometrical balance of such valves, the flow of fluids in a conduit controlled by a valve of this type creates a definite and measurable closing torque at most angular positions of the valve, the value of such torque varying widely and in an irregular manner over the range of angular positions.

Since the balancing mechanism of a fly-weight or centrifugal governor is designed to counterbalance the known centrifugal forces, which may be plotted as straight lines (for the most part) or as smooth curves, it is obvious that the existence, in the throttle valve, of such an inherent or "parasitic" torque characteristic as that mentioned above is seriously detrimental to the governing effect, giving rise to faulty operation under certain load conditions.

Those in the governor art who have recognized the cause of this difficulty have sought by various means to overcome it, as by placing the valve spindle off center, perforating the valve plate, or removing a small portion from one or the other lateral edge of the plate. None of these expedients has succeeded in removing the parasitic torque, but they have resulted only in changing the character of the parasitic torque curve, or in other words, in varying the angular positions of the maximum and minimum values of such torque.

The general object of the present invention is to provide means whereby the harmful effect of the parasitic torque is eliminated, not by eliminating the torque but by completely counterbalancing it. More specifically, it is an object of this invention to provide means, associated with the throttle valve spindle of a centrifugal governor, for applying to the spindle at each angular position thereof a force urging it toward fully opened position, which force is exactly equal to the parasitic closing torque acting on the valve at said angular position.

One suitable mode of carrying out the invention is illustrated in the accompanying drawing in which:

Figure 1 is a transverse sectional view of a conduit controlled by a butterfly valve including balancing means in accordance with the present invention;

Figure 2 is an elevational view at 90° to Figure 1; and

Figure 3 is a diagram showing an actual parasitic torque curve of a geometrically balanced butterfly valve, the torque in pound-inches being plotted against the throttle valve opening in degrees.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

Referring first to Figure 3, it will be seen that in the actual case there illustrated (the governor valve of a powerful internal combustion engine) the maximum parasitic closing torque on the valve occurred at a valve opening of about 14°. Naturally, in fully closed position, there being no flow, there would be no torque in either direction, but from 0° of opening, the parasitic closing torque rises irregularly to the maximum, then descends irregularly to zero at about 59° of opening. This end point will vary according to the physical characteristics of the valve and the velocity of flow, which in turn varies with the pressure differential across the valve.

Having determined the characteristic parasitic torque curve for any particular valve, the torque may be counterbalanced by the means illustrated in Figures 1 and 2, wherein the numeral 10 designates a section of a cylindrical conduit, such as the usual governor capacity adapted to be inserted in the intake conduit of an internal combustion engine. A butterfly valve comprising the plate 11 secured on the spindle 12 is mounted symmetrically in the conduit, the spindle intersecting the axis of the conduit and equal areas of the plate projecting on the respective sides of the spindle. The spindle 12 is mounted for rotation in suitable bearings 13, 14, and one projecting end of the spindle is provided with a lever 15 for connection to the speed-responsive governor mechanism, which is not a part of the present invention, and is not illustrated.

Upon the opposite end of the spindle 12, which likewise projects outwardly of the conduit 10, there is secured a cam 16. A stub shaft 17 projecting from the outer wall of the conduit provides a pivot for a bell crank lever of which one arm 18 carries a cam follower roller 19, adapted to be maintained at all times in contact with the cam 16. The other arm 20 of the bell crank lever is provided with a stud 21 for engaging one end of the spring 22. The opposite end of the spring, which is in tension, engages a fixed stud 23, which may be integral with the conduit casting 10. Preferably the entire counterbalancing mechanism is sealed in a suitable casing, of which the base portion 24 is shown as formed integral with the conduit casting 10.

The contour of the cam 16 is dictated by the parasitic torque characteristic of the valve 11, 12 for the given operating conditions, having in mind the rate and initial tension of the spring 22, and the proportions of the bell crank lever 18, 20, the entire assembly being constructed and arranged so that the force of the spring 22 is applied to the spindle 12, through the bell crank lever and cam, in an amount just equal to the parasitic closing torque acting on the spindle in each angular position thereof. Obviously, no definite formula can be established for the contour of the cam, as each individual case presents a separate problem, depending upon the characteristics and magnitude of the forces involved. However, once the parasitic torque curve has been plotted for the particular valve and operating conditions involved, the cam contour, the spring rate and tension, and the location and proportions of the bell crank lever may easily be correlated by the application of elementary mechanical principles.

It will be apparent that different mechanical arrangements than that illustrated may be employed for carrying into effect the principles of the invention, it being necessary only to have a cam or similar lever on the valve spindle, a resilient means, and means operatively interconnecting said resilient means and said cam lever.

Having thus described the invention, what is claimed as new and desired to be secured by Letters Patent is:

1. In a governor for prime movers, a conduit, a spindle mounted transversely of said conduit and intersecting the longitudinal axis thereof, a butterfly valve mounted on said spindle and adapted to control the passage of fluid through said conduit, and torque balancing means associated with said spindle for counterbalancing the parasitic torque of said valve, said last means comprising a member secured on said spindle externally of said conduit, resilient means carried by said governor, and means connected to said resilient means and bearing on said member, said last means and said member being so constructed and arranged as to transmit the force of said resilient means to said spindle in the required amount depending upon the angular position of said valve in said conduit.

2. In a governor for prime movers, a conduit, a spindle mounted transversely of said conduit and intersecting the longitudinal axis thereof, a butterfly valve mounted on said spindle and adapted to control the passage of fluid through said conduit, and torque balancing means associated with said spindle for counterbalancing the parasitic torque of said valve, said last means comprising a member secured on said spindle externally of said conduit, resilient means carried by said governor, and means connected to said resilient means and bearing on said member, said member having a contour empirically designed in accordance with the parasitic torque characteristics of said valve, and said last mentioned means being adapted to apply the force of said resilient means at different points on the contour of said member as the latter rotates with said spindle.

3. In a governor for prime movers, a conduit, a spindle mounted transversely of said conduit and intersecting the longitudinal axis thereof, a butterfly valve mounted on said spindle and adapted to control the passage of fluid through said conduit, and torque balancing means associated with said spindle for counterbalancing the parasitic torque of said valve, said last means comprising a cam secured on said spindle externally of said conduit, resilient means carried by said governor, and a cam follower connected to said resilient means and bearing on said cam, said cam and cam follower being so constructed and arranged as to transmit the force of said resilient means to said spindle in the required amount depending upon the angular position of said valve in said conduit.

4. In a governor for prime movers, a conduit, a spindle mounted transversely of said conduit and intersecting the longitudinal axis thereof, a butterfly valve mounted on said spindle and adapted to control the passage of fluid through said conduit, and torque balancing means associated with said spindle for counterbalancing the parasitic torque of said valve.

REX C. DARNELL.